(12) United States Patent
Cheung et al.

(10) Patent No.: US 10,709,280 B2
(45) Date of Patent: Jul. 14, 2020

(54) FOOD PROCESSING DEVICE

(71) Applicant: Huiyang Allan Plastic & Electric Industries Co., Limited, Huizhou, Guangdong (CN)

(72) Inventors: Shu Sang Cheung, Huizhou (CN); Xian Liang Ou Yang, Huizhou (CN)

(73) Assignee: Huiyang Allan Plastic & Electric Industries Co., Limited, Guangdong (CN)

( * ) Notice: Subject to any disclaimer, the term of this patent is extended or adjusted under 35 U.S.C. 154(b) by 326 days.

(21) Appl. No.: 15/659,513

(22) Filed: Jul. 25, 2017

(65) Prior Publication Data

US 2018/0028011 A1 Feb. 1, 2018

(30) Foreign Application Priority Data

Jul. 29, 2016 (CN) .......................... 2016 1 0610631

(51) Int. Cl.
*A47J 9/00* (2006.01)
*B26D 1/29* (2006.01)
(Continued)

(52) U.S. Cl.
CPC ............... *A47J 9/002* (2013.01); *A47J 9/006* (2013.01); *A47J 17/16* (2013.01); *A47J 17/18* (2013.01); *A47J 43/044* (2013.01); *A47J 43/046* (2013.01); *A47J 43/06* (2013.01); *A47J 43/08* (2013.01); *A47J 43/082* (2013.01); *A47J 43/085* (2013.01);
(Continued)

(58) Field of Classification Search
CPC .... A47J 9/00; A47J 9/002; A47J 9/006; A47J 17/16; A47J 17/18; A47J 43/06; A47J 43/04; A47J 43/046; A47J 43/0711; A47J 43/0722; A47J 43/0788; A47J 43/0783
See application file for complete search history.

(56) References Cited

U.S. PATENT DOCUMENTS

4,199,112 A * 4/1980 McLean .................. A47J 43/06
241/273.2
4,227,655 A * 10/1980 Williams ................. B26D 1/29
241/273.2
(Continued)

*Primary Examiner* — Brian W Jennison
(74) *Attorney, Agent, or Firm* — Intellectual Property Law Group LLP (57) ABSTRACT

A food processing device, comprising a bowl with a lid, the lid is provided with a food feed tube. The device also has a spiral cutting means provided at the top of the bowl such that as food enters the bowl via the food feed tube it is cut into continuous ribbons or strips. The spiral cutting means comprises a spiral cutter disc base having a disc-set with a plurality of different types of spiral cutting discs, each of which can be separately aligned with the food feed tube to cut the food into a different shaped continuous ribbon or strip. By rotating the spiral cutter disc base the user can line up a first cutting disc with the food feed tube, make some food cuts, then turn the spiral cutter disc base so that a second cutter disk is lined up with the feed tube and then make a different food cut. In this way the user can cut food into different sizes of ribbon, spaghetti, etc. to achieve a superior presentation of food (e.g. fruits and vegetables). The various cuts made possible with the device can also allow the user to be more creative in their food preparation and cooking.

20 Claims, 9 Drawing Sheets

(51) Int. Cl.
*A47J 43/08* (2006.01)
*A47J 43/046* (2006.01)
*A47J 43/044* (2006.01)
*B26D 3/11* (2006.01)
*B26D 3/28* (2006.01)
*A47J 17/16* (2006.01)
*A47J 17/18* (2006.01)
*A47J 43/06* (2006.01)
*B26D 7/00* (2006.01)

(52) U.S. Cl.
CPC ............ *B26D 1/29* (2013.01); *B26D 3/11* (2013.01); *B26D 3/283* (2013.01); *B26D 2007/0018* (2013.01)

(56) References Cited

U.S. PATENT DOCUMENTS

| | | | | |
|---|---|---|---|---|
| 4,256,265 | A * | 3/1981 | Madan | B26D 3/22 |
| | | | | 241/92 |
| 4,367,667 | A * | 1/1983 | Shibata | B26D 3/22 |
| | | | | 241/92 |
| 2005/0185509 | A1 * | 8/2005 | Carnevale | A47J 43/0777 |
| | | | | 99/492 |
| 2005/0194484 | A1 * | 9/2005 | Starr | A47J 43/0716 |
| | | | | 241/285.2 |
| 2010/0154660 | A1 * | 6/2010 | Beber | A47J 43/0711 |
| | | | | 99/537 |
| 2014/0203127 | A1 * | 7/2014 | Merl | A47J 43/0705 |
| | | | | 241/100 |
| 2016/0101533 | A1 | 4/2016 | Aramburo et al. | |
| 2016/0257013 | A1 * | 9/2016 | Exley | B26D 3/11 |
| 2017/0224167 | A1 * | 8/2017 | Zakowski | A47J 43/0716 |

* cited by examiner

FOOD PROCESSING DEVICE

CROSS-REFERENCE TO RELATED APPLICATION

This application claims benefit of China patent application no. 201610610631.4 filed Jul. 29, 2016, the disclosure of which his hereby incorporated by reference in its entirety for all purposes.

BACKGROUND OF THE INVENTION

1. Field of Invention

The invention relates to the field of small household electrical appliances and in particular to a food processing device which can cut the food, such as a carrot, into a continuous spiral ribbon or continuous spaghetti-like strips.

2. Background

Conventional food processing devices in general can perform tasks such as chopping, slicing, or shredding. However, users of food processing devices would like to be able to do more than just chopping, slicing, or shredding with their food processing devices. In home cooking, both the flavor and the presentation of the food are important.

U.S. Patent 2016101533A1 discloses a spiral food processor, which comprises a motor base, a bowl, a bowl cover, a feed tube and a cutter disc. The bowl, which is detachably connected to the motor base, is provided with a cover to prevent the leakage of food. An inner lid is provided under the cover. The inner lid has a cutter that can cut spiral shaped food when the inner lid is rotated about a central axis point. The center axis is located in the middle of the bowl, such that the cutter disc revolves around the central axis under the rotational power of the motor base. The cover has a feed tube that can be positioned at the cover center or at a radial position a certain distance away from the cover center.

By using the correct cutter disc and with the feed tube positioned correctly at the center or at the radial position, the user can perform normal slicing and shredding, or perform spiralizing cuts of food, such as fruits or vegetables. However, users can find the setup cumbersome and confusing with possible mistakes in the selection of the cutter disc and the feed tube position.

SUMMARY OF THE INVENTION

The technical problem to be solved by the present invention is to be achieved through a food processing device according to an embodiment, comprising a bowl with a lid, the lid is provided with a food feed tube; and a spiral cutting means provided at the top of the bowl such that as food enters the bowl via the food feed tube it is cut into continuous ribbons or strips. The spiral cutting means comprises a spiral cutter disc base having a disc-set with a plurality of different types of spiral cutting discs, each of which can be separately aligned with the food feed tube to cut the food into a different shaped continuous ribbon or strip.

Although multiple cutter discs are provided, at any time only the cutting disc positioned directly opposite to the food feed tube can be used. A selection means is provided for the easy manual rotation of the spiral cutter disc base so that the user can switch to use another cutting disc quickly and conveniently.

Preferably the spiral cutter disc base comprises a drive disc group with a plurality of drive discs, one for each of said plurality of cutting discs, positioned between an upper support and a lower support such that the drive discs are engaged with each other.

Further preferably the cutting discs are arranged on the upper support.

Preferably the spiral cutter disc base comprises a drive shaft with a meshing drive to drive the plurality of cutting discs.

Further preferably an upper disc holder and a lower disc holder are provided above and below the drive disc group respectively. The upper and lower ends of the drive shaft are respectively provided with a protective upper washer and a lower washer, as well as bushings.

The spiral cutter disc base is connected with motor drive shaft to receive rotational drive power so that the cutting discs can be driven synchronously.

Preferably the disc-set comprises at least three spiral cutting discs, each of which having a positioning shaft arranged at their center and a cutting blade connected with one side of the positioning shaft. Each spiral cutting disc is mounted on their respective drive disc. Further preferably, the spiral cutting discs are each designed to make a specific cut, such as thin-ribbon cut, thick-ribbon cut, and spaghetti cut.

Further preferably each spiral cutting disc has a core removing component. Additionally or alternatively the three spiral cutting discs are distributed in a planetary arrangement around the center of the spiral cutter disc base.

Preferably the food processing device further comprises a food container that is received within the bowl, and wherein the food container is provided with compartments the number of which corresponds to the number of cutting discs so that food cut using a particular cutting disc can be stored in their respective compartment in the food container. This is useful to users who want to process different fruits or vegetables without mixing up the processed food.

Preferably the food processing device further comprises a drive shaft for transferring drive power from a drive assembly located in a main body of the food processor, to the spiral cutter disc base to drive the cutting discs.

Further preferably the food processing device further comprises a tool selector assembly arranged under the bowl for controlling the rotation of the spiral cutter disc base and, when present, the food container.

Additionally the tool selector assembly may comprise: a ratchet base and a coupling gear, the coupling gear is mounted on the ratchet base, and a gear support, a tool selector rotary element, a slider, a spring and a screw arranged on the coupling gear.

In an alternative embodiment the cutting discs of the spiral cutter disc base may be driven by a drive assembly located in the main body of a hand blender; wherein the hand blender main body is arranged on the lid.

Further preferably the bowl is provided with a tool selector assembly for controlling the rotation of the spiral cutter disc base and, when present, the food container.

Furthermore, the tool selector assembly may also comprise a reduction gear set arranged on a gear cover which, in turn, is arranged at the upper part of the disc-set, and wherein the reduction gear set is matched with the gear cover.

In an alternate embodiment the tool selector assembly may also comprise: an inner position gear that is arranged on a fixed ring; a first tool selector rotary element arranged within the inner position gear; a second tool selector rotary element and a second position gear arranged in combination on the first tool selector rotary element; and wherein one side of the second tool selector rotary element is provided with a spring, a button and a screw.

The invention provides a food processing device, which can be used in a food processor configuration or a hand blender configuration. By using the motor power of a food processor or hand blender to drive the plurality of cutting discs positioned in the spiral cutter disc base, the user can enjoy added creativity in their food preparation. It is also advantageous that the user can easily select the cutting disc that they want to use, without needing to disassemble the food processing device.

These and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

DETAILED DESCRIPTION OF SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention.

Figure 1:
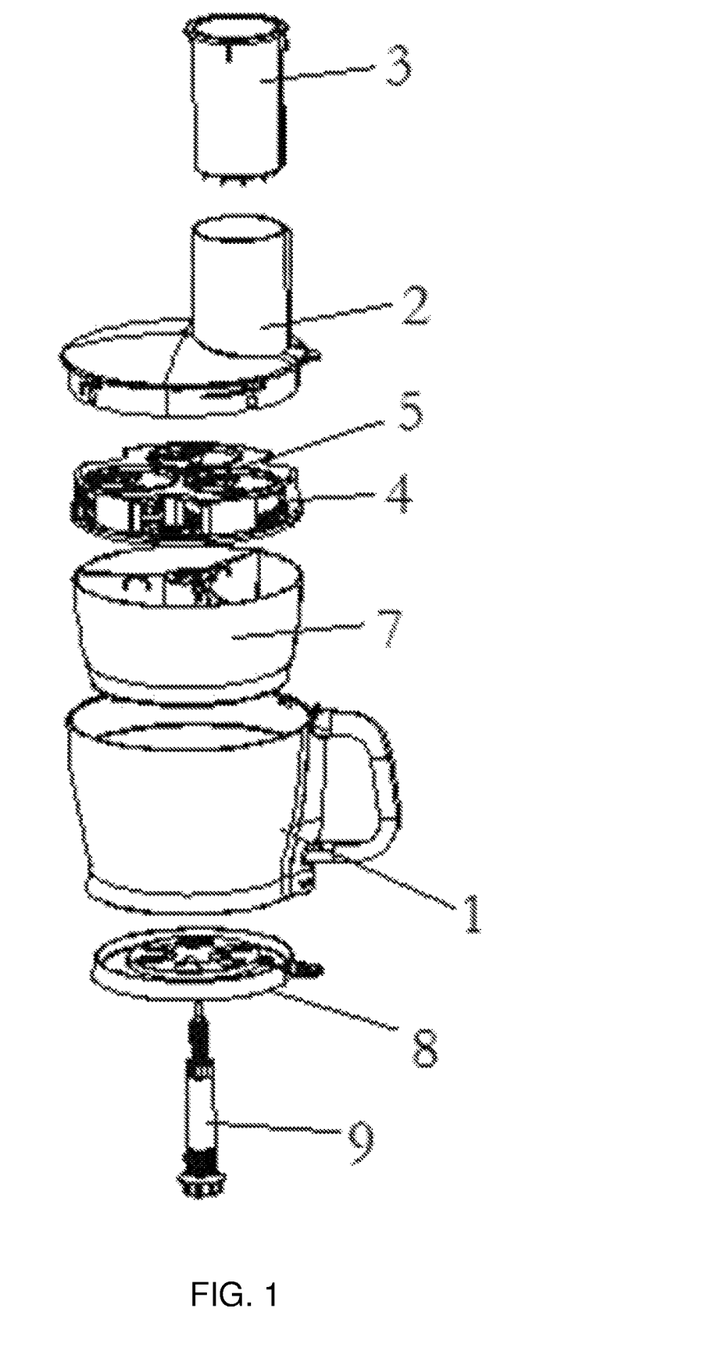
FIG. 1 is an exploded view of the overall structure of the food processing device according to a first embodiment of the present invention.

As shown in FIG. 1, a food processing device comprises a bowl 1. The bowl has a lid 2, which is provided with a food feed tube and optionally a pusher 3 to urge food into the food feed tube. A spiral cutter disc base 4 is positioned at the top of the bowl 1. The spiral cutter disc base is arranged to accept a disc-set 5 which comprises three cutting discs 51, 52, 53. Three kinds of spiral cutter disc can be used to cut food into a continuous ribbon form or spaghetti form.

Figure 2:
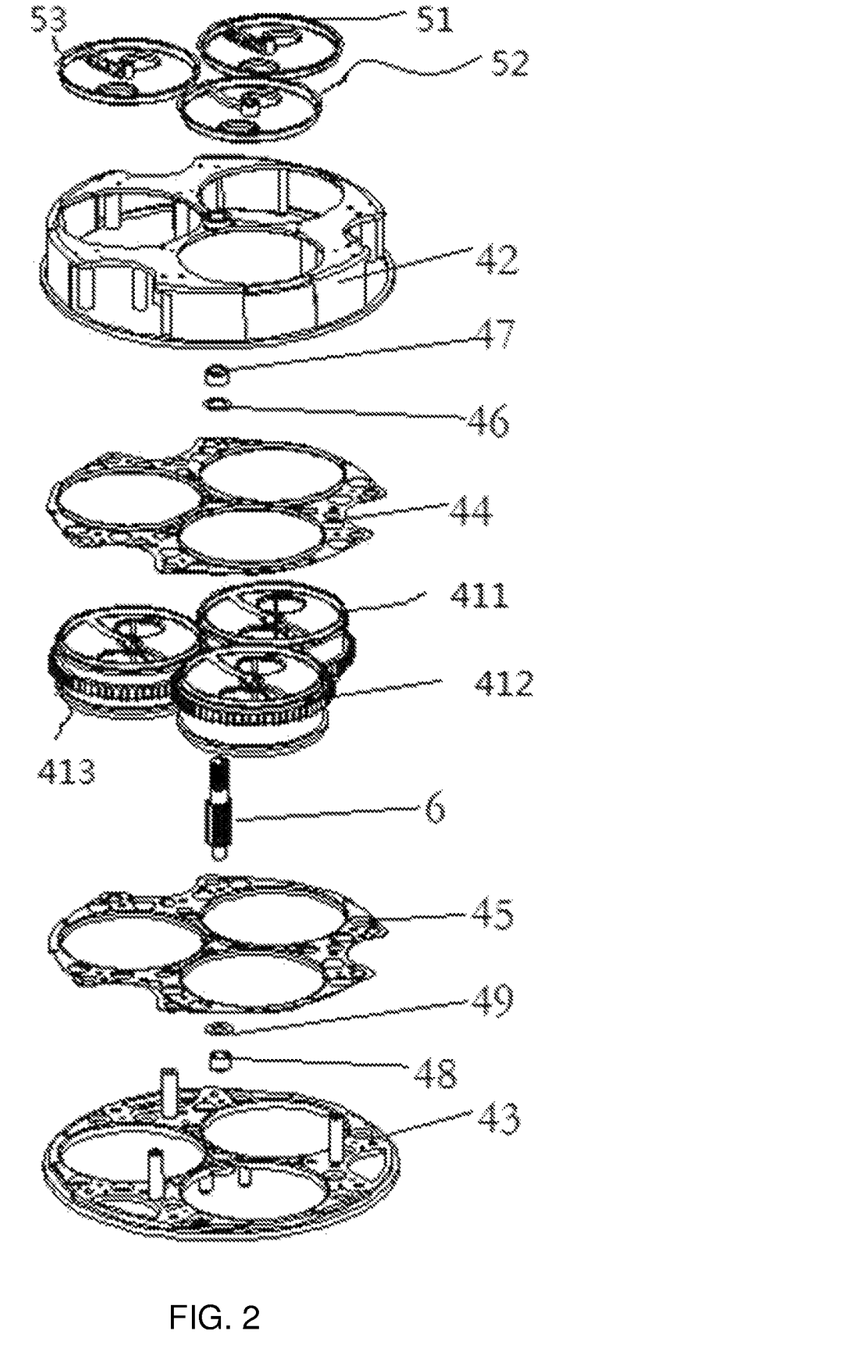
FIG. 2 is an exploded view of the spiral cutter disc base and the disc-set, according to an embodiment of the present invention.
Figure 3:
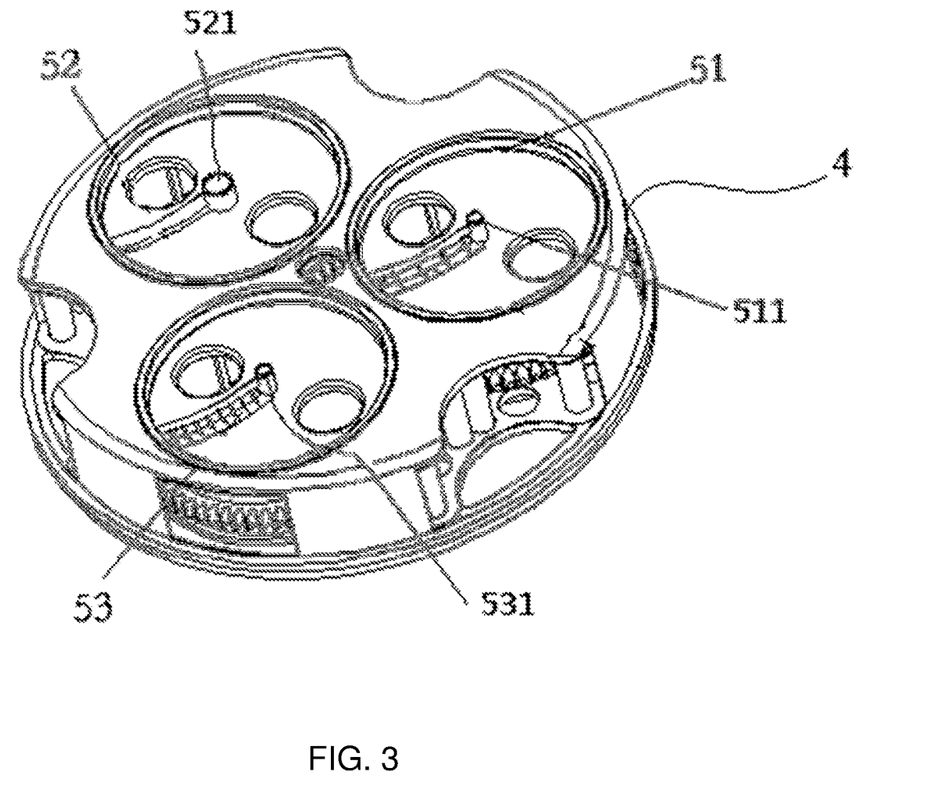
FIG. 3 is a schematic diagram of the local structure of the spiral cutter disc base and the disc-set, according to an embodiment of the present invention.

As shown in FIGS. 2-3, the spiral cutter disc base is arranged to provide power to drive the disc-set. To this end, each spiral cutting disc is mounted on its own drive disc.

The spiral cutter disc base 4 comprises a disc drive group with a first drive disc 411, a second drive disc 412 and a third drive disc 413 that are engaged with each other. An upper support 42 and a lower support 43 are provided for positioning the drive discs. The spiral cutter disc base 4 is provided with a drive shaft 6 that has a meshing drive disc. The disc-set is arranged on the upper support 42, and the drive discs 411, 412, 413 are arranged in the upper support 42.

Above and below the drive disc group are provided a protective upper support holder and a lower supporter holder. Also provided above and below the drive disc group are an upper disc holder 44 and a lower disc holder 45 respectively. The upper and lower ends of the drive shaft 6 are respectively provided with a protective upper washer 46, a bushing 47 and a lower washer 48, and a bushing 49.

The three spiral cutting discs are distributed in a planetary arrangement around the drive shaft, three spiral cutting discs can be used to process different food, which can be shredded, sliced, and cut. The cutting discs are respectively known as the first spiral cutting disc 51, second spiral cutting disc 52 and third spiral cutting disc 53.

Each spiral cutting disc may have a core removal component. A positioning shaft is arranged at the center of each spiral cutting disc, respectively referred to as: positioning shafts 511, 521 and 531.

In each case a cutting knife is connected with one side of the positioning shaft.

The food container 7 is provided with storage compartments, the storage compartments can be filled with different food so that the user can process different types of food without unwanted mixing inside the bowl 1.

Figure 4:
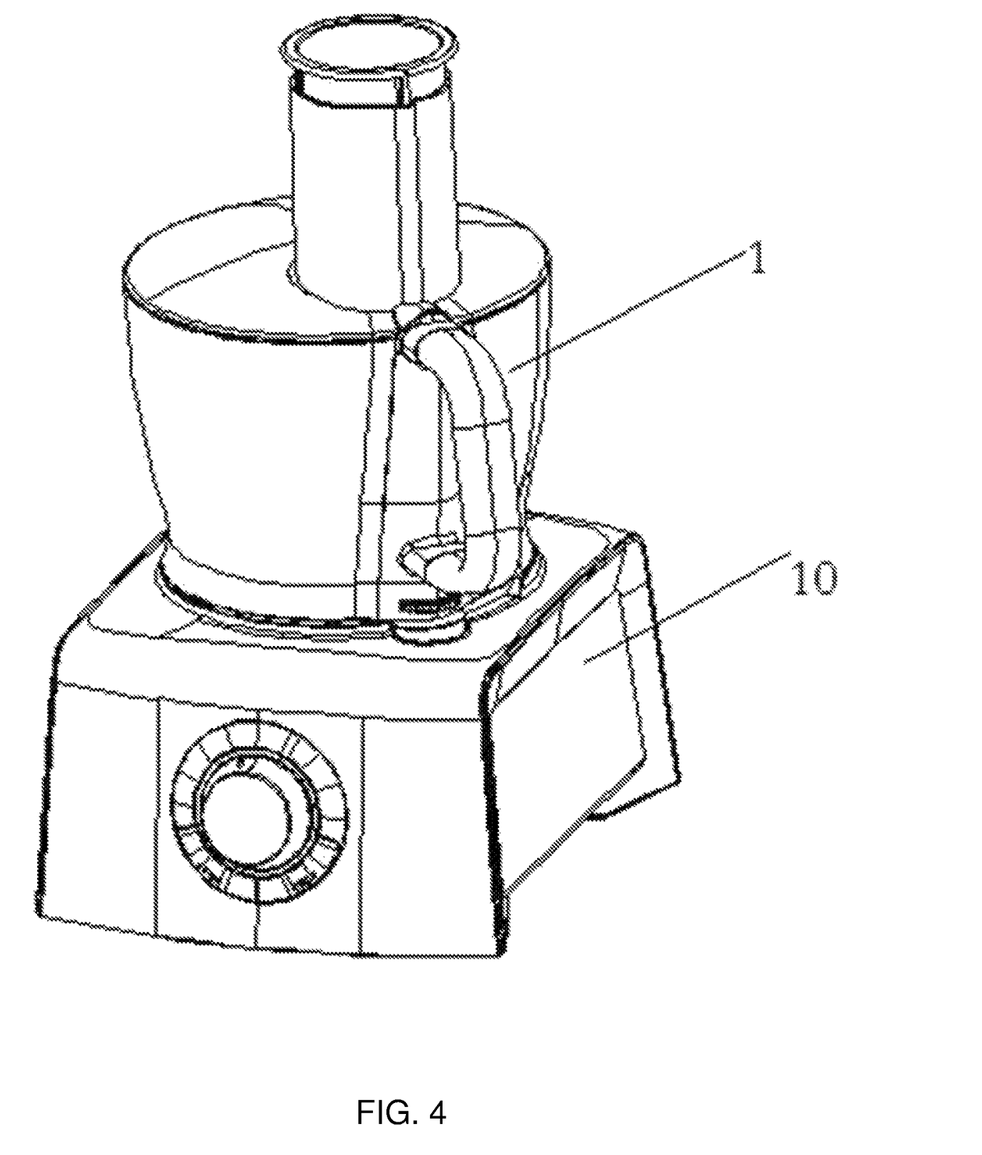
FIG. 4 is a schematic diagram of the overall structure of the first embodiment engaged with a food processer main body.
Figure 5:
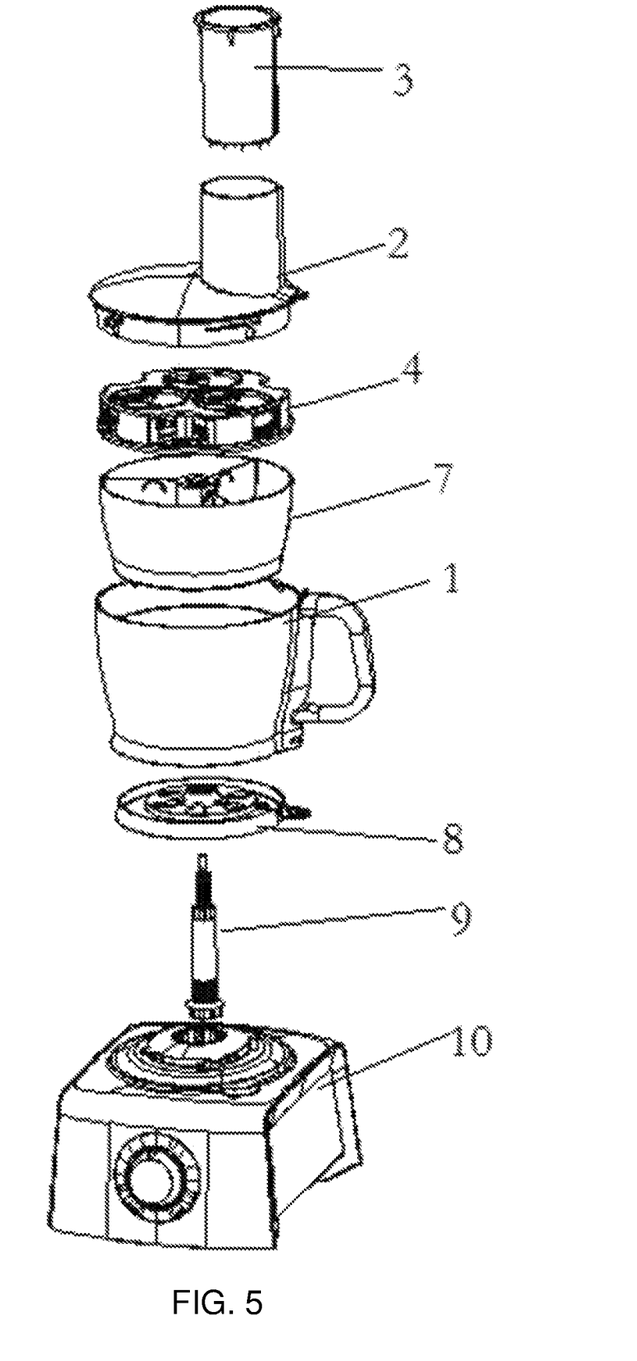
FIG. 5 is an exploded view of the arrangement shown in FIG. 4.
Figure 6:
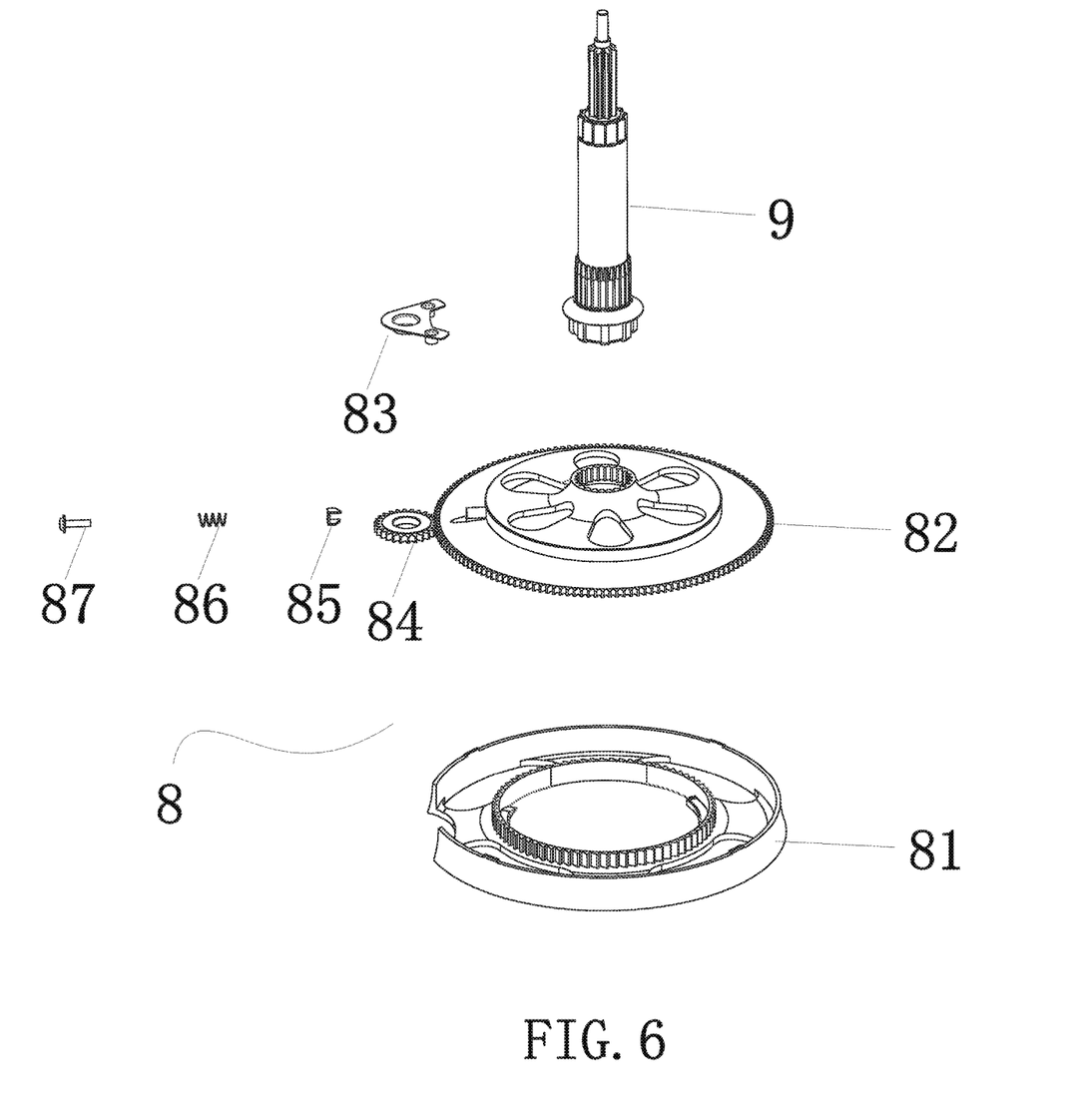
FIG. 6 is the local structure of the tool selector assembly of the first embodiment of the present invention.

A first preferred embodiment of the invention is shown in FIGS. 4-6. A food processor comprising the spiral food processing device is provided with a tool selector assembly 8. A drive shaft 9 is also provided under the bowl for controlling the rotation of the spiral cutter disc base and the food container.

In the first embodiment, the drive assembly is in the form of a food processor main body 10, wherein the food processor is arranged below the bowl, and the drive shaft is connected with the food processor main body and the disc-set.

The tool selector assembly 8 comprises a ratchet base 81 and a coupling gear 82, the coupling gear is mounted on the ratchet base. The gear support 83, a tool selector rotary element 84, a slider 85, a spring 86 and a screw 87 are arranged on the coupling gear 82.

The gear support 83 is connected with the coupling gear and the tool selector rotary element 84. The coupling gear and the tool selector rotary element are engaged with each other. The spring 86 and the slider 85 are connected to the coupling gear 82 through a screw 87.

The motor of the food processor main body 10 provides drive power to the drive shaft 9. The tool selector assembly 8 controls the manual rotation of the spiral cutter disc base 4 and the food container 7.

Before processing food, a user can select the required cutting disc by lining up the disc to face the food feed tube. Once the disc is selected, the motor of the drive assembly in the food processor can be switched on to drive the drive shaft 9. The drive shaft 9 rotates the spiral cutting disc, and then the processed food is ejected into a compartment of the corresponding food container It is envisaged that after processing a certain kind of food, the tool selector assembly 8 can be operated to select another cutting disc so that the user can process another batch of food.

Figure 7:
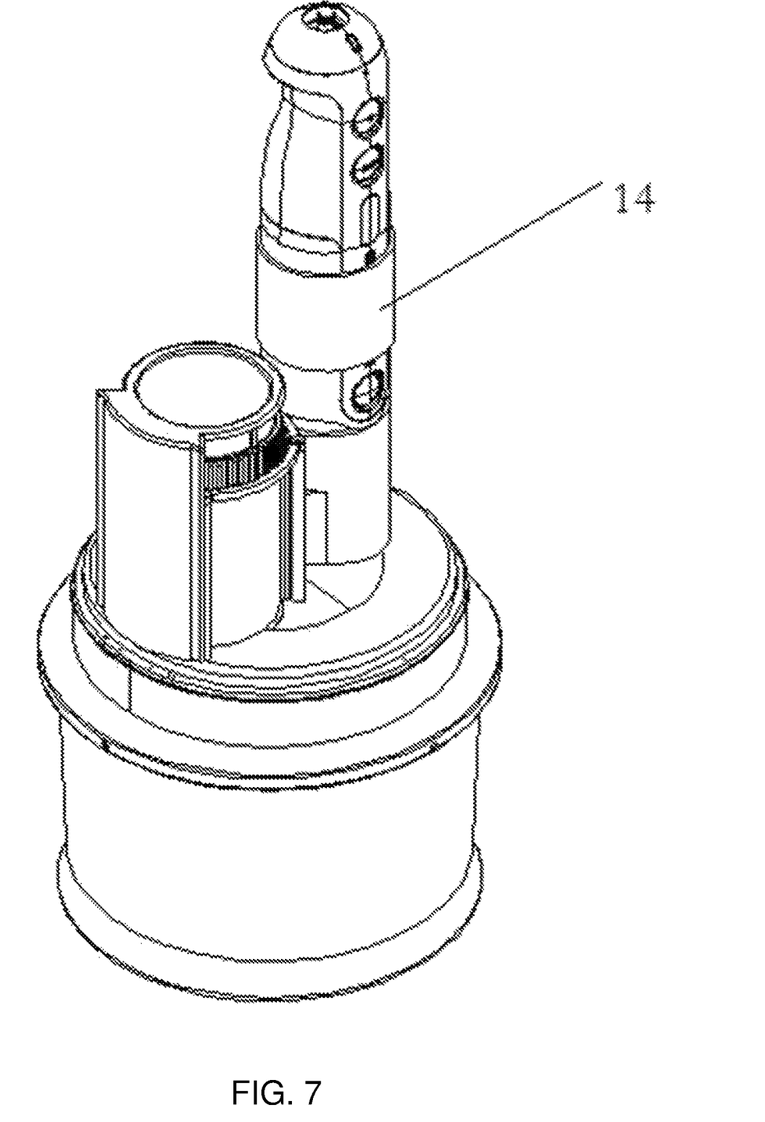
FIG. 7 is a schematic diagram of the overall structure of the food processing device according to a second embodiment engaged with a hand blender.
Figure 8:
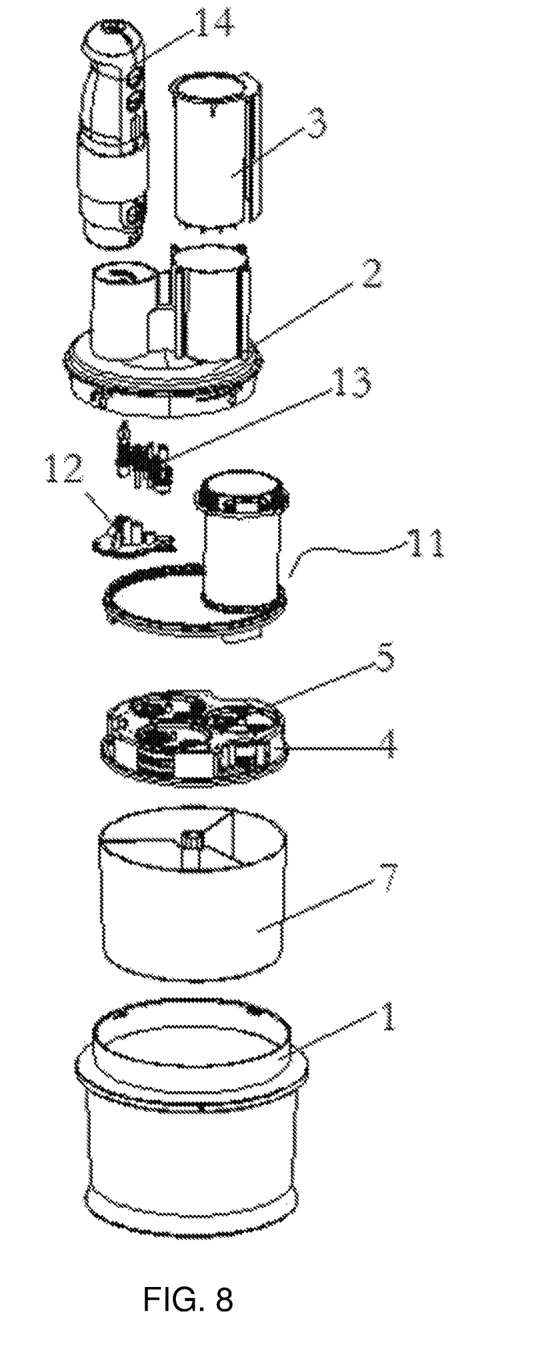
FIG. 8 is an exploded view of the arrangement shown in FIG. 7.
Figure 9:
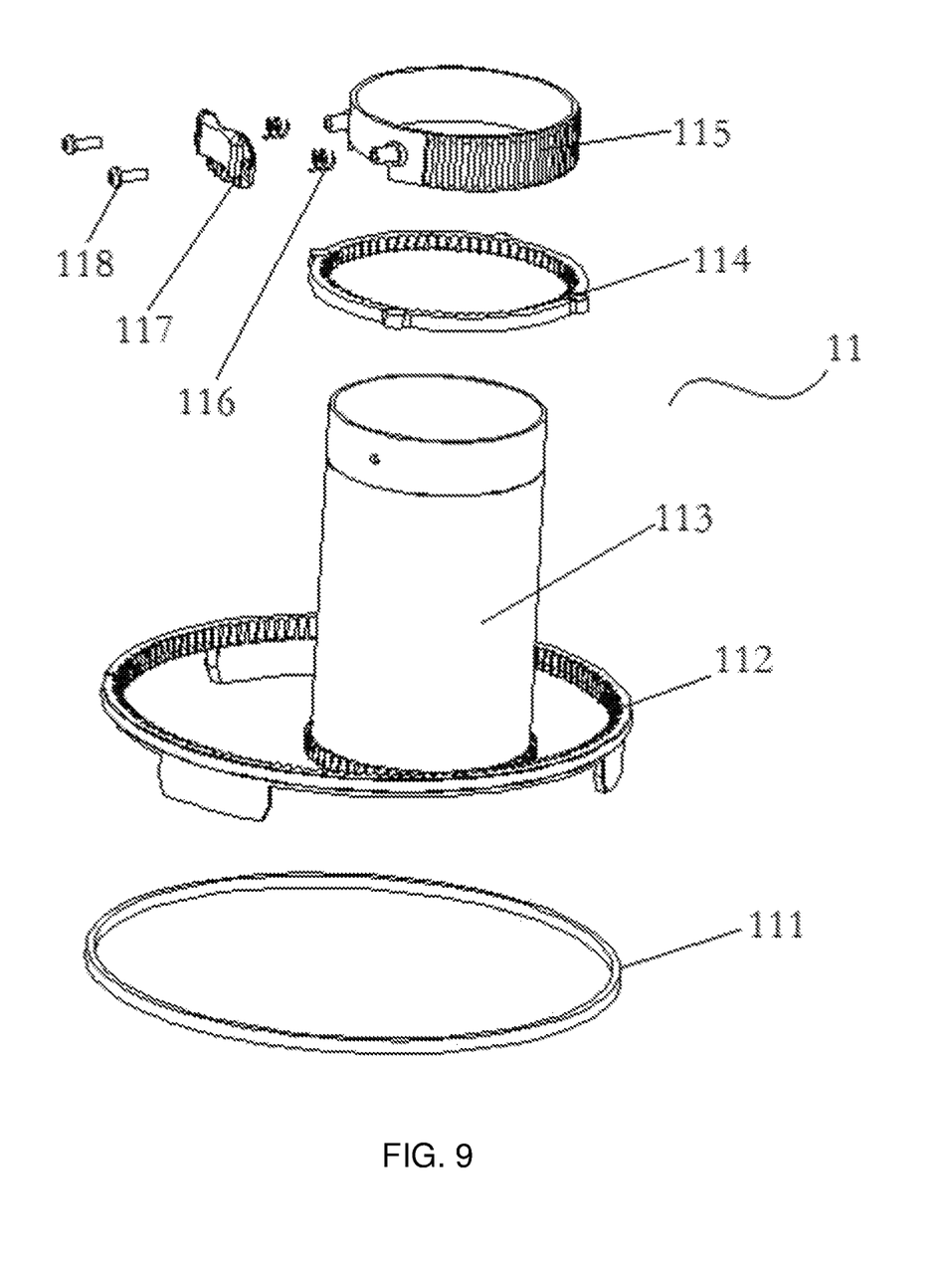
FIG. 9 is the local structure of the tool selector assembly of the second embodiment of the present invention.

A second embodiment of the present invention is shown in FIGS. 7-9. In this variation of the invention, a hand blender main body 14 is combined with a spiral food processing device. The spiral food processing device disclosed in this embodiment is similar in structure to that of the first embodiment. The second embodiment differs in that the drive assembly is in the form of a hand blender main body 14 rather than a food processor.

A hand blender main body is arranged on the lid, the bowl is provided with the tool selector assembly 11 for controlling the rotation of the spiral cutter disc base 4 and the food container 7.

A gear cover 12, with a reduction gear set 13 arranged thereon is provided at the upper part of the disc-set. The reduction gear set is matched with the gear cover. The tool selector assembly 11 comprises a fixed ring 111. An inner position gear 112 is arranged on the fixed ring 111. A first tool selector rotary element 113 is arranged within the inner position gear 112. The position gear 114 and a second rotary element 115 are arranged on the first tool selector rotary element. One side of the second rotary element 115 is provided with a spring 116, a button 117 and a screw 118.

The motor in the drive assembly of the hand blender main body drives the spiral food processing device to drive the drive shaft 6 to drive the disc-set. The tool selector assembly 11 controls the manual rotation of the spiral cutter disc base and the food container.

Before processing food, the user first selects the required spiral cutting disc by lining up the cutting disc with the food feed tube. The user can then start the hand blender motor to provide drive power to the drive shaft 6 to drive the spiral cutting discs. The food inside the food feed tube is then processed by the spiral cutting disc, and the processed food is then ejected into a corresponding compartment of the food container.

After processing a certain kind of food, the user can operate the tool selector assembly 11 to select another cutting disc to process another kind of food.

By way of the two described embodiments, the invention provides a food processing device, which can be used in either a food processor configuration or a hand blender configuration.

The device in accordance with the present invention can realize different types of food processing. In particular, the preparation of fruit or vegetables cut into a continuous ribbon or spaghetti-like strips.

The bowl 1 is provided with a food container 7. The tool selector assembly and the drive shaft 9 are provided under the bowl. The tool selector assembly enables the manual rotation of the spiral cutter disc base and the food container. The drive shaft 9 drives the spiral cutting disc, which cuts the food placed inside the food feed tube.

Although the description of the present invention is carried out in combination with the specific embodiments, it will be appreciated by those familiar with the technical field that the concept layout can be changed and modified while achieving the same effect.

For example, in the description of this invention, there are three cutter discs in the disc-set. It is envisaged that the spiral cutter disc base described can easily be modified to accept two, four or possibly more cutting discs without departing from the present invention. Therefore, all such alternatives, improvements and changes are included in the scope of the claimed invention.

REFERENCE NUMERALS 1. bowl
2. lid
3. pusher
4. spiral cutter disc base
411. first drive disc
412. second disc
413. third drive disc
42. upper support
43. lower support
44. upper disc holder
45. lower disc holder
46. upper washer
47. bushing
48. lower washer
49. bushing
5. disc-set
51. first spiral cutter disc
511. first positioning shaft
52. second spiral cutter disc
521. second positioning shaft
53. third spiral cutter disc
531. third positioning shaft
6. drive shaft
7. food container
8. tool selector assembly
81. ratchet base
82. coupling gear
83. gear support
84. tool selector rotary element
85. slider
86. spring
87. screw
9. drive shaft
10. food processor main body
11. tool selector assembly
111. fixed ring
112. inner position gear
113. first tool selector rotary element
114. position gear
115. second tool selector rotary element
116. spring
117. button
118. screw
12. gear cover
13. gear set
14. hand blender main body

What is claimed is:

1. A food processing device, comprising:
a bowl (1) with a lid (2), the lid is provided with a food feed tube;
a spiral cutting means provided at a top of the bowl (1) such that as food enters the bowl via the food feed tube, the spiral cutting means cuts the food into continuous ribbons or strips; and
characterized in that the spiral cutting means comprises a spiral cutter disc base (4) having a disc-set (5) with a plurality of different types of spiral cutting discs (51, 52, 53), each of which can be separately aligned with the food feed tube to cut the food into a single shape type from among different shaped continuous ribbons or different shaped continuous strips, each spiral cutting disc cuts a single shape type different from every other spiral cutting disc.

2. The food processing device of claim 1, wherein the spiral cutter disc base (4) comprises a drive disc group with a plurality of drive discs (411, 412, 423), one drive disc for each of said spiral cutting discs (51, 52, 53), positioned between an upper support (42) and a lower support (43) such that the drive discs are engaged with each other; and
wherein the spiral cutting discs (51, 52, 53) are arranged on the upper support (42).

3. The food processing device of claim 1, wherein the spiral cutter disc base (4) comprises a drive shaft (6) drive the plurality of spiral cutting discs (51, 52, 53).

4. The food processing device of claim 3, wherein an upper disc holder (44) and a lower disc holder (45) are provided above and below the drive disc group respectively; and wherein upper and lower ends of the drive shaft (6) are respectively provided with a protective upper washer (46) and a lower washer (48) as well as bushings (47, 49).

5. The food processing device of claim 2, wherein the disc-set (5) comprises at least three spiral cutting discs (51, 52, 53), each spiral cutting disc having a positioning shaft (511, 521, 531) arranged at its center and a cutting blade connected with one side of the positioning shaft; and whereby each spiral cutting disc is mounted on its respective drive disc (411, 412, 423).

6. The food processing device of claim 5, wherein each spiral cutting disc (51, 52, 53) has a core removing component.

7. The food processing device of claim 5, wherein the three spiral cutting discs (51, 52, 53) are distributed in a planetary arrangement around a center of the spiral cutter disc base (4).

8. The food processing device of claim 6, wherein the three spiral cutting discs (51, 52, 53) are distributed in a planetary arrangement around a center of the spiral cutter disc base (4).

9. The food processing device of claim 1, further comprising a food container (7) that is received within the bowl (1), and wherein the food container is provided with a number of compartments which corresponds to the number of spiral cutting discs (51, 52, 53) so that food cut using a particular cutting disc can be stored in a respective compartment in the food container (7).

10. The food processing device of claim 9, further comprising a drive shaft (9) for transferring drive power from a drive assembly located in a main body (10) of the food processor to the spiral cutter disc base (4) to drive the cutting discs (51, 52, 53).

11. The food processing device of claim 10, further comprising a tool selector assembly (8) arranged under the bowl (1) for controlling a rotation of the spiral cutter disc base (4) and the food container (7).

12. The food processing device of claim 9, wherein the spiral cutting discs (51, 52, 53) of the spiral cutter disc base (4) are driven by a drive assembly in a main body (14) of a hand blender; wherein the main body of the hand blender is arranged on the lid (2).

13. The food processing device of claim 12, wherein the bowl (1) is provided with a tool selector assembly (11) for controlling a rotation of the spiral cutter disc base (4) and the food container (7).

14. The food processing device of claim 1, further comprising a drive shaft (9) for transferring drive power from a drive assembly located in a main body (10) of the food processor to the spiral cutter disc base (4) to drive the cutting discs (51, 52, 53).

15. The food processing device of claim 14, further comprising a tool selector assembly (8) arranged under the bowl (1) for controlling a rotation of the spiral cutter disc base (4).

16. The food processor of claim 15, wherein the tool selector assembly (8) comprises:
a ratchet base (81) and a coupling gear (82), the coupling gear is mounted on the ratchet base, and
a gear support (83), a tool selector rotary element (84), a slider (85), a spring (86) and a screw (87) arranged on the coupling gear (82).

17. The food processing device of claim 1, wherein the spiral cutting discs (51, 52, 53) of the spiral cutter disc base (4) are driven by a drive assembly in a main body (14) of a hand blender; wherein the main body of the hand blender is arranged on the lid (2).

18. The food processing device of claim 17, wherein the bowl (1) is provided with a tool selector assembly (11) for controlling a rotation of the spiral cutter disc base (4).

19. The food processing device of claim 18, wherein the tool selector assembly (11) comprises a reduction gear set (13) arranged on a gear cover (12) which in turn are arranged at an upper part of the disc-set (5), and wherein the reduction gear set is matched with the gear cover.

20. The food processing device of claim 18, wherein the tool selector assembly (11) comprises:
an inner position gear (112) arranged on a fixed ring (111);
a first tool selector rotary element (113) arranged within the inner position gear (112);
a second tool selector rotary element (115) and a second position gear (114) arranged in combination on the first tool selector rotary element (113); and
wherein one side of the second tool selector rotary element (115) is provided with a spring (116), a button (117) and a screw (118).

* * * * *